United States Patent [19]

Rapp et al.

[11] Patent Number: 5,622,903

[45] Date of Patent: Apr. 22, 1997

[54] IRREGULARLY SHAPED GLASS FIBERS AND INSULATION THEREFROM

[75] Inventors: Charles F. Rapp, Newark; Russell M. Potter, Hebron, both of Ohio

[73] Assignee: Owens-Corning Fiberglas Technology, Inc., Summit, Ill.

[21] Appl. No.: 639,656

[22] Filed: Apr. 29, 1996

Related U.S. Application Data

[63] Continuation-in-part of Ser. No. 435,003, May 4, 1995, abandoned.

[51] Int. Cl.$^6$ ............................ C03C 13/00; C03C 3/085
[52] U.S. Cl. ..................... 501/35; 501/16; 501/66; 501/69; 501/70
[58] Field of Search ................... 501/35, 16, 17, 501/67, 66, 69, 70

[56] References Cited

U.S. PATENT DOCUMENTS

| | | | |
|---|---|---|---|
| 1,828,217 | 10/1931 | Barker, Jr. | 65/121 |
| 2,313,296 | 3/1943 | Lamesch | 428/398 |
| 2,331,945 | 10/1943 | Pazsiczky et al. | 65/428 |
| 2,693,668 | 11/1954 | Slayter | 501/35 |
| 2,877,124 | 3/1959 | Welsch | 501/38 |
| 2,927,621 | 3/1960 | Slayter et al. | 65/504 |
| 2,998,620 | 9/1961 | Stalego | 501/38 |
| 3,073,005 | 1/1963 | Tiede | 428/370 |
| 3,259,479 | 7/1966 | Tiede | 65/438 |
| 3,333,932 | 8/1967 | Tiede | 65/502 |
| 3,653,861 | 4/1972 | Stalego et al. | 65/526 |
| 3,791,806 | 2/1974 | Koizumi et al. | 65/405 |
| 3,881,903 | 5/1975 | Stalego | 65/526 |
| 4,145,199 | 3/1979 | Russell | 65/438 |
| 4,177,077 | 12/1979 | Gagin | 501/35 |
| 4,387,180 | 6/1983 | Jen et al. | 501/31 |
| 4,707,399 | 11/1987 | Rambosek | 428/225 |
| 5,055,428 | 10/1991 | Porter | 501/35 |
| 5,108,957 | 4/1992 | Cohen et al. | 501/35 |
| 5,332,698 | 7/1994 | Nyssen et al. | 501/35 |
| 5,401,693 | 3/1995 | Bauer et al. | 501/38 |
| 5,431,992 | 7/1995 | Houpt et al. | 428/224 |
| 5,523,264 | 6/1996 | Mattson | 501/35 |
| 5,523,265 | 6/1996 | Rapp et al. | 501/35 |

FOREIGN PATENT DOCUMENTS

| | | |
|---|---|---|
| 0399320 | 11/1990 | European Pat. Off. . |
| 0412878 | 2/1991 | European Pat. Off. . |
| 0588251 | 3/1994 | European Pat. Off. . |
| 8912032 | 12/1989 | WIPO . |
| 9512700 | 5/1995 | WIPO . |
| WO9512554 | 5/1995 | WIPO . |

OTHER PUBLICATIONS

Paul, "Polymer Blends", 1978, pp. 193–200. No month.
Kirk–Othmer "Encyclopedia of Chemical Technology", 3rd ed., vol. 11, pp. 807–817. No date.
Derwent Abstracts, AN 74–46346V, 1974. No month.

*Primary Examiner*—Mark L. Bell
*Assistant Examiner*—Louis M. Troilo
*Attorney, Agent, or Firm*—C. Michael Gegenheimer; Linda S. Evans

[57] ABSTRACT

Irregularly shaped glass fibers and insulation therefrom comprise two different glasses having differing coefficients of thermal expansion. These glasses also have physical properties which allow current processes to fabricate them into insulation. The glasses also meet German recommendations regarding a KI value of 40 or above.

34 Claims, 4 Drawing Sheets

IRREGULARLY SHAPED GLASS FIBERS AND INSULATION THEREFROM

CROSS-REFERENCE TO RELATED APPLICATION

This is a continuation-in-part of U.S. Ser. No. 08/435,003, filed May 4, 1995, now abandoned.

TECHNICAL FIELD OF THE INVENTION

This invention relates to irregularly shaped glass fibers suitable for insulation. Each glass fiber comprises two distinct glasses.

BACKGROUND OF THE INVENTION

Glass fibers, mineral fibers and other wool materials have been insulating buildings for some time. Insulation easily fits into the spaces in attics, ceilings, walls, floors and the like.

The common prior art methods for producing glass fiber insulation products involve producing glass fibers from a rotary process. A single molten glass composition is forced through the orifices in the outer wall of a centrifuge or spinner, producing primarily straight glass fibers. The fibers are drawn downward by a blower. The binder required to bond the fibers into a wool product is sprayed onto the fibers as they are drawn downward. The fibers are then collected and formed into a wool pack.

Recent developments include insulation which installs rapidly and effectively between the studs of a building. An exterior layer covers the fibrous batt. Preferably, the exterior layer covering comprises a polyethylene package which receives the fibrous batt. Another focal point of recent developments in insulation is one in which all the binder or essentially all the binder is no longer present in the fibrous batt. Evolution of processes for producing low-density insulation provides satisfactory resiliency without a binder in the batt.

Still other developments are insulations of mineral fibers which are irregular in shape. Fibers that are irregular, rather than straight, kinked or even curly, provide a more uniform lattice structure. This uniform volume filling allows for higher recovery ratios. More importantly, uniform volume filling also results in significantly lower thermal conductivity. Also, the greater entanglement of irregularly shaped fibers provides better wool pack integrity. By sufficient integrity, it is meant that the fibers of the wool batt will remain entangled and not separate.

SUMMARY OF THE INVENTION

The present invention provides irregularly shaped glass fibers suitable for insulation. Each glass fiber comprises two distinct glasses. Each glass has a different coefficient of thermal expansion (CTE) differing by at least 2 ppm/°C. Each glass has a different composition. Each glass composition has a log viscosity of 3 at a temperature ranging from 1600° to 2050° F. (982° to 1121° C.) and a liquidus temperature at least 50° F. (28° C.) below the temperature for a log viscosity 3.

The compositions comprising glass pairs we have invented also meet the German government's recommendation for glass fibers. The glass compositions meet the German recommendation as they have a numerical index (KI) greater than or equal to 40. The German recommendation requires a numerical index (KI) greater than or equal to 40 to be considered free of suspicion. The index is calculated by the following equation: $KI=\Sigma(Na_2O, K_2O, CaO, MgO, BaO, B_2O_3)-2Al_2O_3$. This places severe restrictions on alumina and silica levels in the glass. Nonetheless, we have found glass compositions with advantageous properties meeting the German recommendation.

A preferred fiber according to the invention has a pair of glass compositions (A and B) consisting essentially of:

| | Weight Percent | |
| --- | --- | --- |
| Ingredients | A | B |
| $SiO_2$ | 45–60 | 30–60 |
| $Al_2O_3$ | 0–3 | 0–10 |
| $B_2O_3$ | 0–20 | 15–50 |
| $Na_2O + K_2O$ | 12–22 | 2–15 |
| $MgO + CaO$ | 0–14 | 0–25 |
| $BaO$ | 0–35 | 0–30 | and less than 10% of any or all of $ZrO_2$, $TiO_2$, $Fe_2O_3$, ZnO, SrO or $Li_2O$, the total of all ingredients being 100% by weight, wherein each glass composition has a KI value equal to or greater than 40. More preferably, the MgO+CaO content in glass composition B is from 0 to 14% by weight.

PREFERRED EMBODIMENTS OF THE INVENTION

Figure 1:
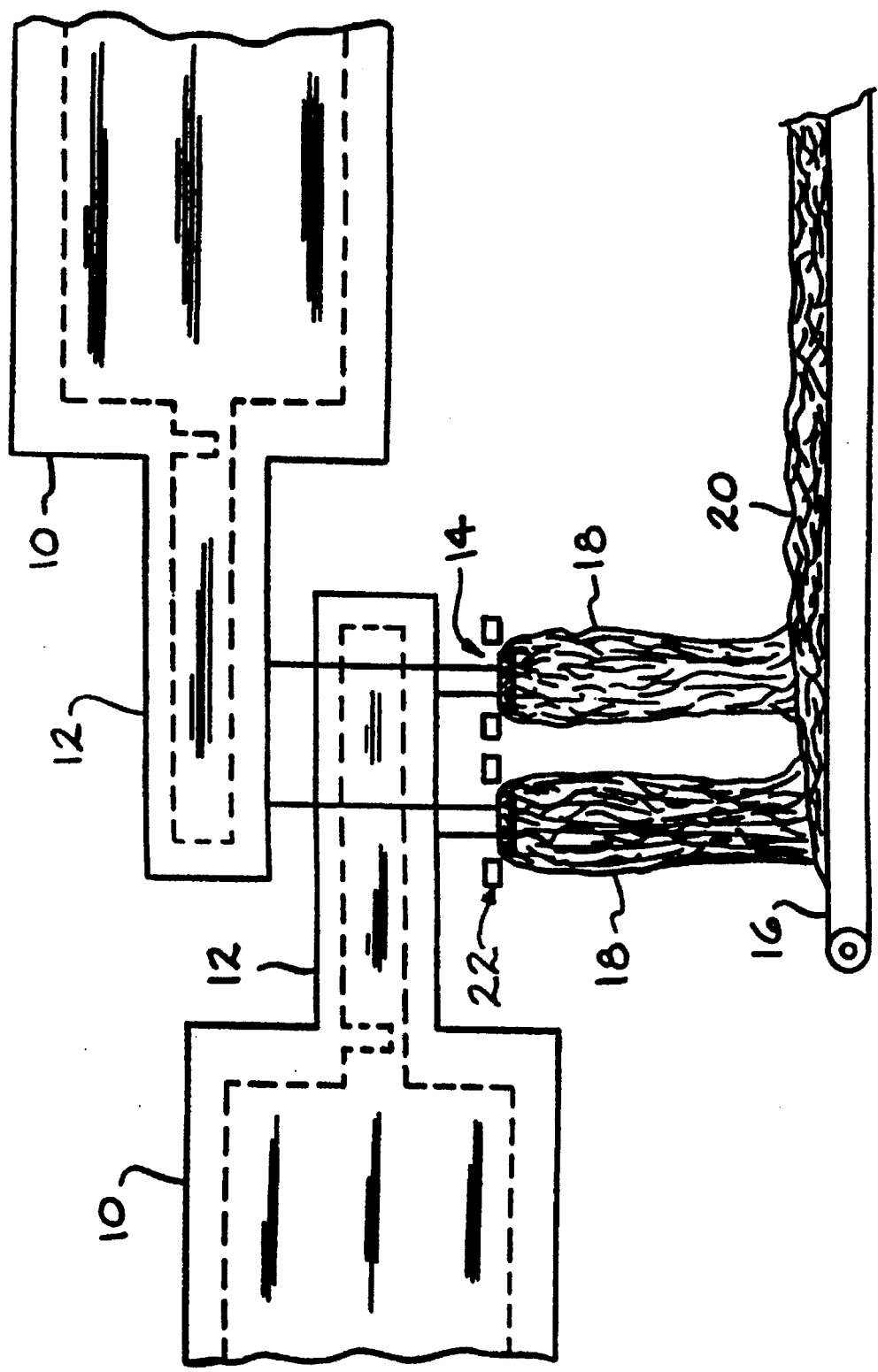
FIG. 1 is a view of a process by which the insulation of the present invention may be produced.

One preferred pair of glass compositions (A and B) for making irregularly shaped fibers consists essentially of:

| | Weight Percent | |
| --- | --- | --- |
| Ingredients | A | B |
| $SiO_2$ | 45–60 | 30–60 |
| $Al_2O_3$ | 0–3 | 0–10 |
| $B_2O_3$ | 10–20 | 25–50 |
| $Na_2O + K_2O$ | 14–22 | 5–15 |
| $MgO + CaO$ | 6–14 | 0–25, more preferably 0–14 |
| $BaO$ | Less than 2 | Less than 2 | and less than 5% of any or all of $ZrO_2$, $TiO_2$, $Fe_2O_3$, ZnO, SrO or $Li_2O$, the total being 100% by weight, wherein each glass composition has a KI value equal to or greater than 40.

More preferably, the pair of glass compositions consists essentially of:

| Ingredients | Weight Percent | |
|---|---|---|
| | A | B |
| SiO$_2$ | 47–57 | 35–55 |
| Al$_2$O$_3$ | 1–3 | 1–8 |
| B$_2$O$_3$ | 12–18 | 30–50 |
| Na$_2$O + K$_2$O | 14–22 | 5–15 |
| MgO + CaO | 6–14 | 0–10 |
| BaO | Less than 2 | Less than 2 | and less than 2% of any or all of ZrO$_2$, TiO$_2$, Fe$_2$O$_3$, ZnO, SrO or Li$_2$O, the total being 100% by weight, wherein each glass composition has a KI value equal to or greater than 40.

A second preferred pair of glass compositions consists essentially of:

| Ingredients | Weight Percent | |
|---|---|---|
| | A | B |
| SiO$_2$ | 45–60 | 30–60 |
| Al$_2$O$_3$ | 0–3 | 0–10 |
| B$_2$O$_3$ | 0–20 | 15–40 |
| Na$_2$O + K$_2$O | 12–22 | 2–15 |
| MgO + CaO | 0–14 | 0–25, more preferably 0–14 |
| BaO | 0–35, more preferably 2–35 | 0–30, more preferably 2–30 | and less than 5% of any or all of ZrO$_2$, TiO$_2$, Fe$_2$O$_3$, ZnO, SrO or Li$_2$O, the total being 100% by weight, wherein each glass composition has a KI value equal to or greater than 40.

More preferably, the second pair of glass compositions consists essentially of:

| Ingredients | Weight Percent | |
|---|---|---|
| | A | B |
| SiO$_2$ | 45–57 | 35–57 |
| Al$_2$O$_3$ | 0.8–3 | 1–10 |
| B$_2$O$_3$ | 0–18 | 15–35 |
| Na$_2$O + K$_2$O | 12–22 | 3–15 |
| MgO + CaO | 0–14 | 0–25, more preferably 0–10 |
| BaO | 2–30 | 0–25, more preferably 2–25 | and less than 2% of any or all of ZrO$_2$, TiO$_2$, Fe$_2$O$_3$, ZnO, SrO or Li$_2$O, the total being 100% by weight, and wherein each glass composition has a KI value equal to or greater than 40. Even more preferably, in the second pair of glass compositions, the first glass (A) has a BaO content of 5 to 30% by weight; and the second glass (B) has a BaO content of 0 to 25% by weight, more preferably 5 to 25% by weight.

In general, insulation products of irregularly shaped glass fibers according to this invention can be made using suitable means and methods, such as those described and shown in U.S. Pat. No. 5,431,992 to Houpt et al., the disclosure of which is incorporated by reference herein.

Preferably, fibers in accordance with the invention are made by the direct-forming method described in International Publication No. WO 95/30787 and U.S. Ser. No. 08/240,428 to Scott et al., filed May 10, 1994 (see especially FIG. 1 thereof), the disclosures of which are also incorporated by reference. After the fibers are formed, they may be stored for shipment, e.g., to compositers (before or after chopping), or further processed as appropriate for the desired end use. For example, if the fibers are to be used to prepare insulation, they may be encapsulated, chopped and then rolled using appropriate means known in the art.

Alternatively, insulation products of irregularly shaped glass fibers of the present invention can be produced from a rotary fiber forming process as shown in FIG. 1 herein. Referring to FIG. 1, furnaces 10 supply two distinct molten glass compositions via forehearths 12 to fiberizers 14. Veils of irregularly shaped glass fibers 18 produced by the fiberizers are collected on conveyor 16 as wool pack 20 by means of a vacuum positioned beneath the conveyor. As the fibers are blown downward by air or gases to the conveyor by means of blowers 22 in the fiberizers, they are attenuated and assume their irregular shape.

Figure 2:
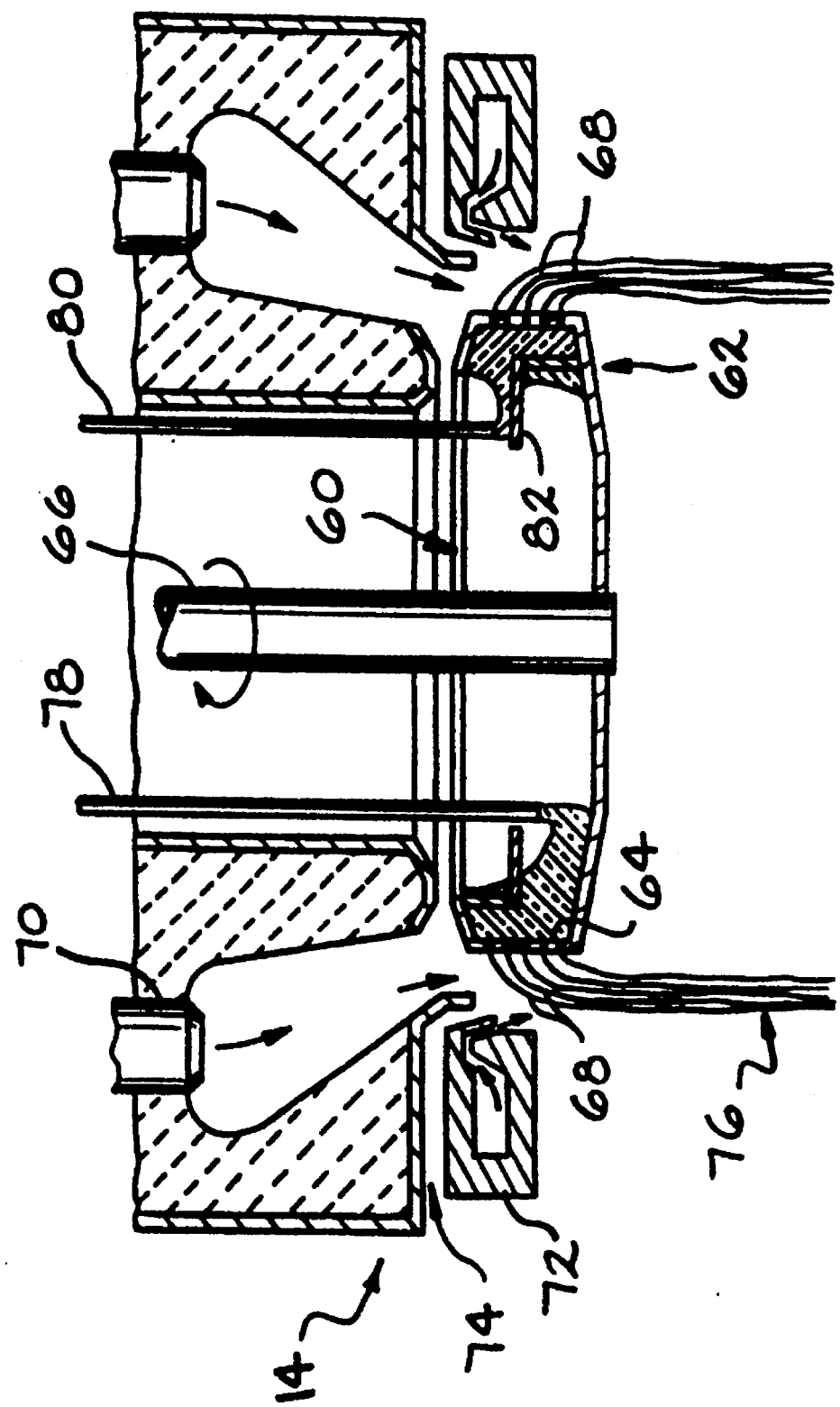
FIG. 2 is a view of a fiberizer by which the fibers of the present invention may be produced.

FIG. 2 shows that fiberizers 14 are spinners 60. Spinner 60 is comprised of spinner bottom wall 62 and spinner peripheral wall 64. Spindle 66 rotates spinner 60. The rotation of the spinner centrifuges molten glass through the spinner peripheral wall into primary fibers 68. The primary fibers are maintained in soft, attenuable condition by the heat of annular burner 70. In one embodiment of manufacturing fibers according to the invention, an internal burner (not shown) provides heat to the interior of the spinner. Annular blower 72, using induced air 74, pulls the primary fibers and further attenuates them into secondary fibers 76, suitable for use in wool insulating materials. The secondary fibers, or bi-component glass fibers, are then collected for formation into a wool pack.

The interior of the spinner is supplied with two separate streams of molten glass, first stream 78 containing glass A and second stream 80 containing glass B. The glass in stream 78 drops directly onto the spinner bottom wall and flows outwardly with centrifugal force toward the spinner peripheral wall to form a head of glass A. Glass B in molten glass stream 80 is positioned closer to the spinner peripheral wall than stream 78, and the glass in stream 80 is intercepted by horizontal flange 82 before it can reach the spinner bottom wall. Thus, a build-up or head of glass B is formed on the horizontal flange.

Figure 3:
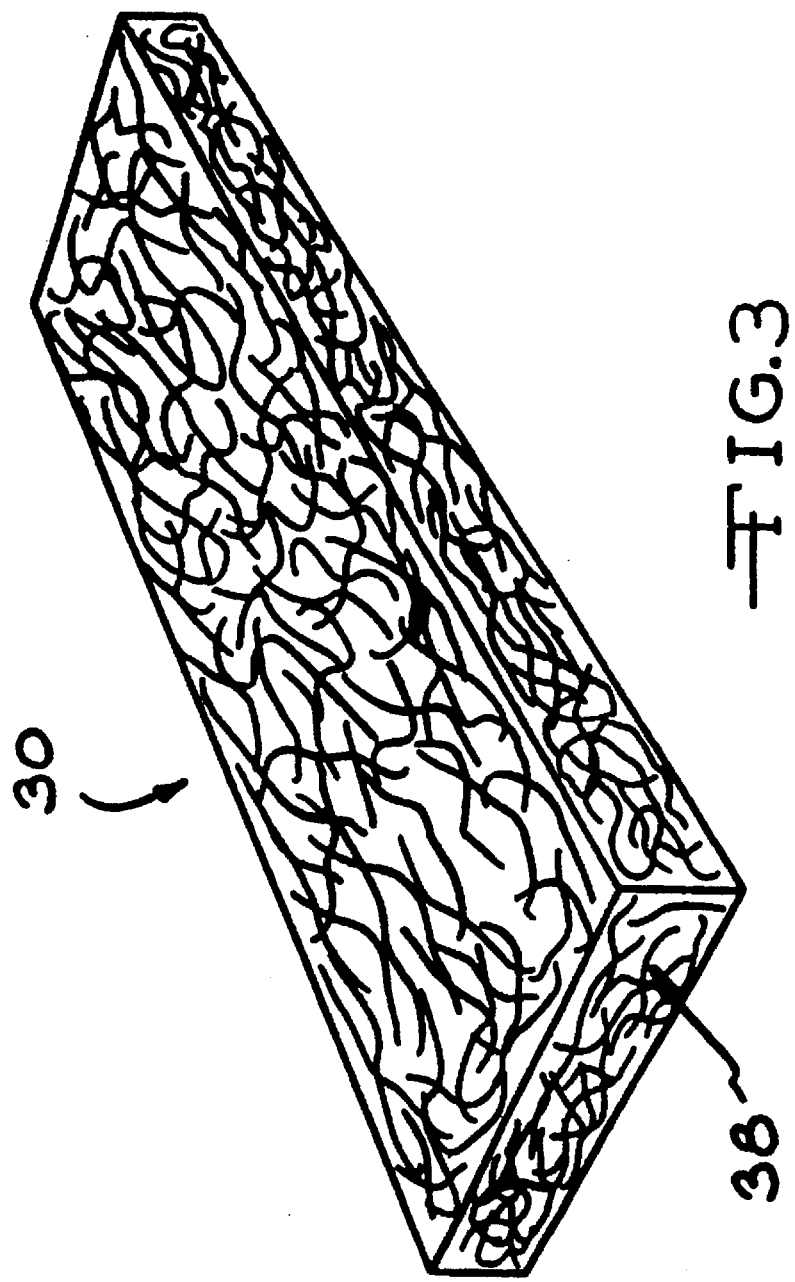
FIG. 3 is a view of insulation showing entangled, irregularly shaped fibers of the invention.

FIG. 3 shows insulation product 30 comprised of entangled, irregularly shaped glass fibers 38.

Figure 4:
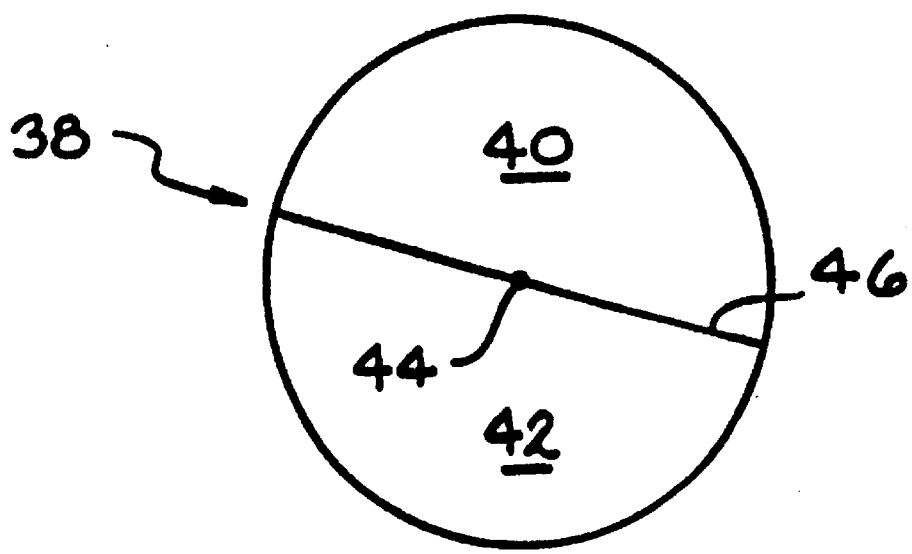
FIG. 4 is a cross-sectional view of an irregularly shaped fiber of the invention having a 50:50 A/B glass ratio.

FIG. 4 is a cross-sectional view of an ideal irregularly shaped glass fiber 38 having a 50:50 A/B glass ratio. Halves 40 and 42 essentially are equal in the ideal, with point 44 being the center and line 46 being the diameter.

Figure 5:
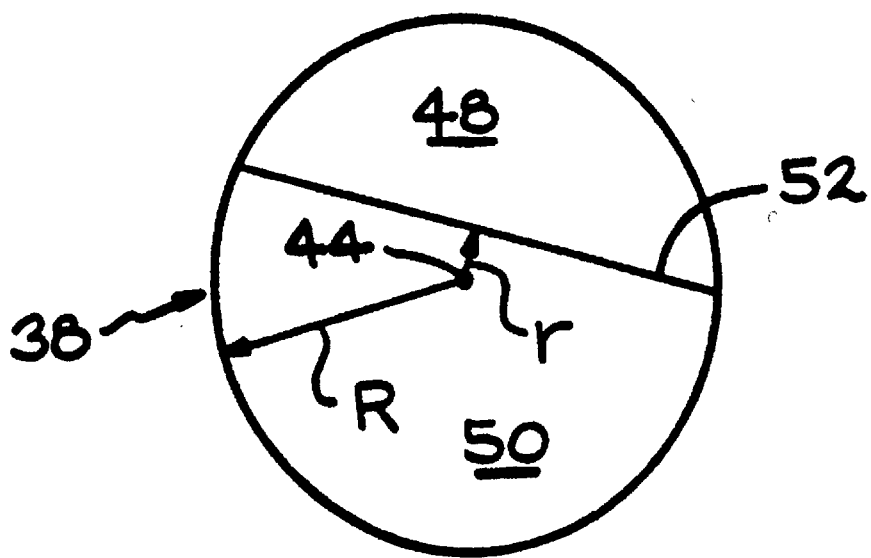
FIG. 5 is a cross-sectional view of an irregularly shaped fiber having an A/B glass ratio of less than 50:50.

FIG. 5 shows a more typical cross-section where halves 48 and 50 are not equal. Line 52 is no longer a diameter, but just a divider. Lines R and r are shown to locate center point 44.

The deviation ratio is a measure of how far the A/B glass ratio is away from 50:50. The larger the deviation from 50:50, the larger r will be as a percent of R. It has been found that the average deviation ratio of the irregularly shaped glass fibers of the invention is typically greater than about 5%, generally greater than about 15%, and in many cases, greater than about 30%.

The irregularly shaped fibers of the present invention are preferably dual-glass fibers, i.e., each fiber is composed of two different glass compositions, glass A and glass B. If one were to make a cross-section of an ideal irregularly shaped glass fiber of the present invention, one half of the fiber would be glass A, with the other half glass B. In practice, a wide range of proportions of the amounts of glass A and glass B may exist in the various irregularly shaped glass fibers in the wool insulating material (or perhaps even over the length of an individual fiber). The percentage of glass A may vary within the range of from about 15 to about 85% of the total glass in each of the irregularly shaped glass fibers, with the balance of total glass being glass B. In general, insulation products of the irregularly shaped fibers will contain fibers of all different combinations of the percentages of glass A and glass B, including a small fraction of fibers that are single-component.

Cross-section photographs of fibers are obtained by mounting a bundle of fibers in epoxy, with the fibers oriented in parallel as much as possible. The epoxy plug is then cross-sectioned using a diamond saw blade, and one of the new surfaces is polished using various grinding media. The polished sample surface is then coated with a thin carbon layer to provide a conductive sample for analysis by scanning electron microscopy (SEM). The sample is then examined by SEM using a backscattered-electron detector, which displays variations in average atomic number as a variation in the gray scale. This analysis reveals the presence of two glasses by a darker and lighter region on the cross-section of the fiber, and shows the interface of the two glasses.

Due to a continuously changing attenuation environment, each irregularly shaped fiber is twisted in a unique way. No two fibers are exactly alike. The fiber's final shape is one with a baseline curvature due to the dual-glass nature, which is modified by the twisting, irregular rotation of the plane of curvature caused by the continuously changing attenuation environment. The fiber has a baseline curvature that is twisted through three dimensions. It is generally not helical. The fiber's irregular nature allows the irregularly shaped glass fibers to stand apart from one another and achieve a uniform volume-filling nature.

Examples of the compositions are given in the following table. All the glass compositions have KI indices of 40 or higher.

EXAMPLE I

Irregularly shaped glass fibers of the present invention have the following compositions. Several of the compositions have approximate forming temperatures (the temperature where the viscosity of the glass is about 1,000 poise) and liquidus temperatures given. The pairs of glasses will be selected so that they have a coefficient of thermal expansion (CTE) differing by at least 2 ppm/C.

Table I contains examples of glass compositions for component A of the first preferred pair of glass compositions.

TABLE I

| Ingredients | Weight Percent | | | | | | |
|---|---|---|---|---|---|---|---|
| | 1 | 2 | 3 | 4 | 5 | 6 | 7 |
| $SiO_2$ | 53.7 | 56.3 | 56.3 | 56.3 | 54.4 | 54.4 | 54.4 |
| $Al_2O_3$ | 2 | 1 | 1 | 1 | 1 | 1 | 1 |
| $B_2O_3$ | 16 | 16.9 | 15.1 | 13.3 | 17 | 17.1 | 17 |
| $Na_2O$ | 17.3 | 14.7 | 14.7 | 14.8 | 14.6 | 14.5 | 14.6 |
| $K_2O$ | 0.7 | 0.8 | 0.8 | 0.8 | 0.8 | 0.8 | 0.8 |
| MgO | 2.2 | 2.6 | 3.1 | 3.5 | 2.6 | 2.6 | 2.6 |
| CaO | 8.1 | 7.3 | 8.6 | 9.9 | 7.3 | 7.2 | 7.3 |
| ZnO | 0 | 0 | 0 | 0 | 0 | 0 | 2 |
| $TiO_2$ | 0 | 0.1 | 0.1 | 0.1 | 2 | 0.1 | 0.1 |
| $Fe_2O_3$ | 0.1 | 0.3 | 0.3 | 0.3 | 0.3 | 0.3 | 0.3 |
| $ZrO_2$ | 0 | 0 | 0 | 0 | 0 | 2 | 0 |
| T (F) for a viscosity of 1,000 Poise | 1677 | 1726 | 1727 | 1725 | 1711 | 1737 | 1705 |
| Liquidus Temperature (F.) | 1446 | 1487 | 1587 | 1659 | 1426 | 1466 | 1551 |
| KI | 40.3 | 40.3 | 40.3 | 40.3 | 40.3 | 40.3 | 40.3 |
| durability (% wt. loss of fiber after 24 hrs)* | 4 | 6 | — | — | 18 | 18 | 4 |

*Exposure to water at 205 F.

Table II contains examples of glass compositions for component B of the first preferred pair of glass compositions.

TABLE II

| Ingredients | Weight Percent | | | | | | |
|---|---|---|---|---|---|---|---|
| | 8 | 9 | 10 | 11 | 12 | 13 | 14 |
| $SiO_2$ | 53.7 | 47.7 | 41.7 | 35.7 | 47.6 | 41.6 | 35.5 |
| $Al_2O_3$ | 2 | 4 | 6 | 8 | 4 | 6.1 | 8.1 |
| $B_2O_3$ | 34.6 | 38.7 | 42.9 | 47 | 36.1 | 40.3 | 44.5 |
| $Na_2O$ | 9.7 | 9.6 | 9.4 | 9.3 | 7.9 | 7.8 | 7.7 |
| CaO | 0 | 0 | 0 | 0 | 4.4 | 4.3 | 4.2 |
| T(F) for a viscosity of 1,000 Poise | 1790 | 1738 | 1704 | 1657 | 1776 | 1724 | 1690 |
| Liquidus | 1517 | 1308 | <1288 | <1200 | 1669 | 1651 | 1554 |

TABLE II-continued

| Ingredients | Weight Percent | | | | | | |
|---|---|---|---|---|---|---|---|
| | 8 | 9 | 10 | 11 | 12 | 13 | 14 |
| Temperature (F.) | | | | | | | |
| KI durability (% wt. loss of fibers after 2 hrs)* | 40.3 — | 40.3 48 | 40.3 50 | 40.3 53 | 40.3 — | 40.3 45 | 40.3 — |

*Exposure to water at 205 F.

Table III contains examples of glass compositions for component A of the second preferred pair of glass compositions.

TABLE III

| Ingredients | Weight Percent | | | | | |
|---|---|---|---|---|---|---|
| | 15 | 16 | 17 | 18 | 19 | 20 |
| $SiO_2$ | 54.5 | 55 | 56.3 | 56.4 | 56.5 | 56.5 |
| $Al_2O_3$ | 0.9 | 1 | 1 | 1 | 1 | 0.9 |
| $B_2O_3$ | 1.5 | 1.5 | 15.1 | 13.3 | 9.8 | 6.2 |
| $Na_2O$ | 12.4 | 12.5 | 14.5 | 14.4 | 14.1 | 13.8 |
| $K_2O$ | 6 | 6 | 0.8 | 0.8 | 0.7 | 0.7 |
| MgO | 1.1 | 1.1 | 2.6 | 2.6 | 2.5 | 2.5 |
| CaO | 3.1 | 3.1 | 7.3 | 7.1 | 7 | 6.9 |
| BaO | 17.8 | 17.8 | 2 | 4 | 8 | 12.1 |
| $TiO_2$ | 0 | 0 | 0.1 | 0.1 | 0.1 | 0.1 |
| $Fe_2O_3$ | 0.2 | 0.2 | 0.3 | 0.3 | 0.3 | 0.3 |
| $ZrO_2$ | 2.5 | 1.7 | 0 | 0 | 0 | 0 |
| T (F) for a viscosity of 1,000 Poise | 1903 | 1882 | 1737 | 1738 | 1761 | 1789 |
| Liquidus Temperature (F.) | 1524 | — | 1498 | 1481 | 1548 | 1553 |
| KI durability (% wt. loss of fiber after 24 hrs)* | 40 7 | 40 — | 40.3 4.7 | 40.3 4.3 | 40.3 3.8 | 40.3 3.6 |

*Exposure to water at 205 F.

TABLE III

| Ingredients | Weight Percent | |
|---|---|---|
| | 21 | 22 |
| $SiO_2$ | 55.2 | 54.8 |
| $Al_2O_3$ | 1.6 | 1.7 |
| $B_2O_3$ | 0 | 0 |
| $Na_2O$ | 15.5 | 16.5 |
| $K_2O$ | 0 | 0 |
| MgO | 0 | 1.8 |
| CaO | 0 | 4 |
| BaO | 27.7 | 21.2 |
| $TiO_2$ | 0 | 0 |
| $Fe_2O_3$ | 0.3 | 0 |
| $ZrO_2$ | 0 | 0 |
| T (F) for a viscosity of 1,000 Poise | 1883 | 1867 |
| Liquidus Temperature (F.) | — | — |
| KI durability (% wt. loss of fibers after 24 hrs)* | 40 — | 40 — |

*Exposure to water at 205 F.

Table IV contains examples of glass compositions for component B of the second preferred pair of glass compositions.

TABLE IV

| Ingredients | Weight Percent | | | |
|---|---|---|---|---|
| | 22 | 24 | 25 | 26 |
| $SiO_2$ | 49.4 | 42.7 | 42.6 | 49.8 |
| $Al_2O_3$ | 3.5 | 5.7 | 5.7 | 3.2 |
| $B_2O_3$ | 21 | 34 | 31.5 | 21.2 |
| $K_2O$ | 3 | 6.6 | 5.1 | 5.1 |
| $K_2O$ | 3.2 | 0 | 0 | 0 |
| MgO | 0 | 0 | 0 | 0 |
| CaO | 0 | 0 | 4 | 0 |
| BaO | 19.9 | 1 | 11.1 | 20.1 |
| $Fe_2O_3$ | 0.1 | 0 | 0 | 0.2 |
| $ZrO_2$ | 0 | 0 | 0 | 0.4 |
| T (F) for viscosity of 1,000 Poise | 1930 | 1778 | 1808 | 1910 |
| Liquidus Temperature (F.) | 1641 | 1506 | — | 1811 |
| KI durability (% wt. loss of fiber after 24 hrs)* | 40 9.5 | 40.3 — | 40.3 — | 40 — |

| Ingredients | 27 | 28 | 29 |
|---|---|---|---|
| $SiO_2$ | 50.2 | 49.9 | 49.5 |
| $Al_2O_3$ | 3.2 | 3.3 | 3.4 |
| $B_2O_3$ | 21.2 | 21.8 | 22.7 |
| $Na_2O$ | 5.1 | 5.2 | 5.4 |
| $K_2O$ | 0 | 0 | 0 |
| MgO | 0 | 0 | 2 |
| CaO | 0 | 3.2 | 4.4 |
| BaO | 20.1 | 16.4 | 12.4 |
| $Fe_2O_3$ | 0.2 | 0.2 | 0.2 |
| $ZrO_2$ | 0 | 0 | 0 |
| T (F) for a viscosity of 1,000 Poise | 1910 | 1868 | 1850 |
| Liquidus Temperature (F.) | 1798 | — | — |
| KI durability (% wt. loss of fibers after 2 hr)* | 40 9 | 40 — | 40 7.4 |

*Exposure to water at 205 F.

EXAMPLE II

Irregular-shaped glass fibers of the present invention were produced using high-expansion glass composition #1 and low-expansion glass composition #10 of Example I above. Irregular-shaped fibers also were produced from high-expansion glass #15 and low-expansion glass #23. Fibers were produced at a low rate by blowing the fibers from a split-tip, single-hole bushing in the laboratory. The wool batt showed excellent recovery when compressed.

EXAMPLE III

Fibers are prepared by using a low-expansion, KI 40 glass (one of compositions 30-32) with a high-expansion, KI 40 glass (one of compositions 33-35) selected from the following compositions in Table V.

TABLE V

| Ingredient | 30 | 31 | 32 weight percent | 33 | 34 | 35 |
| --- | --- | --- | --- | --- | --- | --- |
| $SiO_2$ | 43.43 | 43.47 | 44.61 | 54.50 | 54.44 | 54.36 |
| $Al_2O_3$ | 5.37 | 5.35 | 5.13 | 1.83 | 1.86 | 1.88 |
| $B_2O_3$ | 26.67 | 26.58 | 25.63 | 4.27 | 6.50 | 8.78 |
| $Na_2O$ | 5.93 | 7.88 | 6.28 | 17.43 | 17.67 | 17.91 |
| $K_2O$ | 0.02 | 0.01 | 1.15 | 0 | 0 | 0 |
| MgO | 1.96 | 1.69 | 1.29 | 2.82 | 2.86 | 2.90 |
| CaO | 16.16 | 14.54 | 10.94 | 6.41 | 6.49 | 6.58 |
| SrO | 0.41 | 0.41 | 0 | 0 | 0 | 0 |
| BaO | 0 | 0 | 4.96 | 12.73 | 10.19 | 7.59 |
| CTE | 6.88 | 7.35 | 7.04 | 11.27 | 11.06 | 10.85 |
| meas'd log n = 3 | 1748 | 1718 | 1760 | 1748 | 1715 | 1702 |
| liquidus temp. (delta T, degr. F.) | 1669 | 1634 | 1631 | 1553 | 1491 | 1494 |
| durability in water for 2 hrs at 205 F. | — | — | — | 2.42 | — | — |

Especially preferred bi-component glass fibers are made using glass composition #'s 32 and 33 together.

Such preferred high-expansion glasses allow for use of forming temperatures from about 1650° to about 1865° F. The CTE values are approximately 11 ppm/C, and the liquidus temperatures are about 200° F. below the forming temperature.

With respect to the preferred low-expansion glasses, the CTE values are about 7 ppm/C, and the forming temperatures are from about 1720° to about 1760° F. (on lab melts as batched). The liquidus temperatures are about 129° F. below the forming temperatures, but the temperature differentials may be lower, e.g., from about 50° to about 100° F. below the forming temperature to obtain other good glasses.

The foregoing examples and detailed disclosure have been provided to illustrate preferred embodiments and aspects of the invention. Artisans will recognize apparent modifications. Accordingly, the invention is to be understood as not being limited thereby, but rather, as being defined by the appended claims and their equivalents.

We claim:

1. An irregularly shaped glass fiber suitable for insulation, the glass fiber comprising two distinct glasses, wherein each glass has:

a different coefficient of thermal expansion, where the two coefficients differ by at least 2.0 ppm/C;

a temperature for a log viscosity of 3 ranging from 1600° to 2050° F. (982° to 1121° C.) and a liquidus temperature at least 50° F. (28° C.) below the log viscosity of 3;

a KI value equal to or greater than 40; and a different composition, wherein (i) a first composition consists essentially of 45–60 percent by weight $SiO_2$, 0–3 percent by weight $Al_2O_3$, 0–20 percent by weight $B_2O_3$, 12–22 percent by weight $Na_2O+K_2O$, 0–14 percent by weight MgO+CaO, 0–35 percent by weight BaO, and less than about 10 percent by weight of any or all of $ZrO_2$, $TiO_2$, $Fe_2O_3$, ZnO, SrO or $Li_2O$, the total of all ingredients being 100 percent by weight, and (ii) a second composition consists essentially of 30–60 percent by weight $SiO_2$, 0–10 percent by weight $Al_2O_3$, 15–50 percent by weight $B_2O_3$, 2–15 percent by weight $Na_2O+K_2O$, 0–25 percent by weight MgO+CaO, 0–30 percent by weight BaO, and less than about 10 percent by weight of any or all of $ZrO_2$, $TiO_2$, $Fe_2O_3$, ZnO, SrO or $Li_2O$, the total of all ingredients being 100 percent by weight.

2. An irregularly shaped fiber according to claim 1, wherein in the second composition, the MgO+CaO content is 0–14 percent by weight.

3. An irregularly shaped glass fiber according to claim 1, wherein (i) the first composition consists essentially of 45–60 percent by weight $SiO_2$, 0–3 percent by weight $Al_2O_3$, 10–20 percent by weight $B_2O_3$, 14–22 percent by weight $Na_2O+K_2O$, 6–14 percent by weight MgO+CaO, less than 2 percent by weight BaO, and less than about 5 percent by weight of any or all of $ZrO_2$, $TiO_2$, $Fe_2O_3$, ZnO, SrO or $Li_2O$, the total of all ingredients being 100 percent by weight, and (ii) the second composition consists essentially of 30–60 percent by weight $SiO_2$, 0–10 percent by weight $Al_2O_3$, 25–50 percent by weight $B_2O_3$, 5–15 percent by weight $Na_2O+K_2O$, 0–25 percent by weight MgO+CaO, less than 2 percent by weight BaO, and less than about 5 percent by weight of any or all of $ZrO_2$, $TiO_2$, $Fe_2O_3$, ZnO, SrO or $Li_2O$, the total of all ingredients being 100 percent by weight.

4. An irregularly shaped fiber according to claim 3, wherein in the second composition, the MgO+CaO content is 0–14 percent by weight.

5. An irregularly shaped glass fiber according to claim 1, wherein (i) the first composition consists essentially of 47–57 percent by weight $SiO_2$, 1–3 percent by weight $Al_2O_3$, 12–18 percent by weight $B_2O_3$, 14–22 percent by weight $Na_2O+K_2O$, 6–14 percent by weight MgO+CaO, less than 2 percent by weight BaO, and less than about 2 percent by weight of any or all of $ZrO_2$, $TiO_2$, $Fe_2O_3$, ZnO, SrO or $Li_2O$, the total of all ingredients being 100 percent by weight, and (ii) the second composition consists essentially of 35–55 percent by weight $SiO_2$, 1–8 percent by weight $Al_2O_3$, 30–50 percent by weight $B_2O_3$, 5–15 percent by weight $Na_2O+K_2O$, 0–10 percent by weight MgO+CaO, less than 2 percent by weight BaO, and less than about 2 percent by weight of any or all of $ZrO_2$, $TiO_2$, $Fe_2O_3$, ZnO, SrO or $Li_2O$, the total of all ingredients being 100 percent by weight.

6. An irregularly shaped glass fiber according to claim 1, wherein (i) the first composition consists essentially of 45–60 percent by weight $SiO_2$, 0–3 percent by weight $Al_2O_3$, 0–20 percent by weight $B_2O_3$, 12–22 percent by weight $Na_2O+K_2O$, 0–14 percent by weight MgO+CaO, 0–35 percent by weight BaO, and less than about 5 percent by weight of any or all of $ZrO_2$, $TiO_2$, $Fe_2O_3$, ZnO, SrO or $Li_2O$, the total of all ingredients being 100 percent by weight, and (ii) the second composition consists essentially of 30–60 percent by weight $SiO_2$, 0–10 percent by weight $Al_2O_3$, 15–45 percent by weight $B_2O_3$, 2–15 percent by weight $Na_2O+K_2O$, 0–25 percent by weight MgO+CaO, 0–30 percent by weight BaO, and less than about 5 percent by weight of any or all of $ZrO_2$, $TiO_2$, $Fe_2O_3$, ZnO, SrO or $Li_2O$, the total of all ingredients being 100 percent by weight.

7. An irregularly shaped glass fiber according to claim 6, wherein: (i) in the first composition, the BaO content is 2–35 percent by weight; and (ii) in the second composition, the MgO+CaO content is 0–14 percent by weight, and the BaO content is 2–30 percent by weight.

8. An irregularly shaped glass fiber according to claim 6, wherein the $B_2O_3$ content in the second composition is 15–40 percent by weight.

9. An irregularly shaped glass fiber according to claim 1, wherein (i) the first composition consists essentially of 45–57 percent by weight $SiO_2$, 0.8–3 percent by weight $Al_2O_3$, 0–18 percent by weight $B_2O_3$, 12–22 percent by weight $Na_2O+K_2O$, 0–14 percent by weight MgO+CaO, 2–30 percent by weight BaO, and less than about 2 percent by weight of any or all of $ZrO_2$, $TiO_2$, $Fe_2O_3$, ZnO, SrO or $Li_2O$, the total of all ingredients being 100 percent by weight, and (ii) the second composition consists essentially of 35–57 percent by weight $SiO_2$, 1–10 percent by weight $Al_2O_3$, 15–35 percent by weight $B_2O_3$, 3–15 percent by weight $Na_2O+K_2O$, 0–25 percent by weight MgO+CaO, 0–25 percent by weight BaO, and less than about 2 percent by weight of any or all of $ZrO_2$, $TiO_2$, $Fe_2O_3$, ZnO, SrO or $Li_2O$, the total of all ingredients being 100 percent by weight.

10. An irregularly shaped glass fiber according to claim 9, wherein in the second composition, the MgO+CaO content is 0–10 percent by weight, and the BaO content is 2–25 percent by weight.

11. An irregularly shaped glass fiber according to claim 9, wherein in the first composition, the BaO content is 5–30 percent by weight.

12. An irregularly shaped glass fiber according to claim 1, wherein in the second composition, the BaO content is 5–25 percent by weight.

13. An irregularly shaped glass fiber according to claim 4, wherein: (i) the first composition consists essentially of 53.7 percent by weight SiOn, 2.0 percent by weight $Al_2O_3$, 16.0 percent by weight $B_2O_3$, 17.3 percent by weight $Na_2O$, 0.7 percent by weight $K_2O$, 2.2 percent by weight MgO, and 8.1 percent by weight CaO; and (ii) the second composition consists essentially of 41.7 percent by weight $SiO_2$, 6.0 percent by weight $Al_2O_3$, 42.9 percent by weight $B_2O_3$, and 9.4 percent by weight $Na_2O$.

14. An irregularly shaped glass fiber according to claim 7, wherein: (i) the first composition consists essentially of 54.5 percent by weight $SiO_2$, 0.9 percent by weight $Al_2O_3$, 1.5 percent by weight $B_2O_3$, 12.4 percent by weight $Na_2O$, 6.0 percent by weight $K_2O$, 1.1 percent by weight MgO, 3.1 percent by weight CaO, 17.8 percent by weight BaO, 0.2 percent by weight $Fe_2O_3$, and 2.5 percent by weight $ZrO_2$; and (ii) the second composition consists essentially of 49.4 percent by weight $SiO_2$, 3.5 percent by weight $Al_2O_3$, 21.0 percent by weight $B_2O_3$, 3.0 percent by weight $Na_2O$, 3.2 percent by weight $K_2O$, 19.9 percent by weight BaO, and 0.1 percent by weight $Fe_2O_3$.

15. An irregularly shaped glass fiber according to claim 7, wherein at least one of the first and second glass compositions includes ZnO.

16. An irregularly shaped glass fiber according to claim 7, wherein at least one of the first and second glass compositions include 0.1–2 percent by weight ZnO.

17. An irregularly shaped glass fiber comprising: (i) a first composition consisting essentially of 44.6 percent by weight $SiO_2$, 5.13 percent by weight $Al_2O_3$, 25.63 percent by weight $B_2O_3$, 6.28 percent by weight $Na_2O$, 1.15 percent by weight $K_2O$, 1.29 percent by weight MgO, 10.94 percent by weight CaO, and 4.96 percent by weight BaO; and (ii) a second composition consisting essentially of 54.50 percent by weight $SiO_2$, 1.83 percent by weight $Al_2O_3$, 4.27 percent by weight $B_2O_3$, 17.43 percent by weight $Na_2O$, 2.82 percent by weight MgO, 6.41 percent by weight CaO, and 12.73 percent by weight BaO.

18. Glass-fiber insulation comprising a collection of irregularly shaped glass fibers according to claim 1.

19. Glass-fiber insulation comprising a collection of irregularly shaped glass fibers according to claim 2.

20. Glass-fiber insulation comprising a collection of irregularly shaped glass fibers according to claim 3.

21. Glass-fiber insulation comprising a collection of irregularly shaped glass fibers according to claim 4.

22. Glass-fiber insulation comprising a collection of irregularly shaped glass fibers according to claim 5.

23. Glass-fiber insulation comprising a collection of irregularly shaped glass fibers according to claim 6.

24. Glass-fiber insulation comprising a collection of irregularly shaped glass fibers according to claim 7.

25. Glass-fiber insulation comprising a collection of irregularly shaped glass fibers according to claim 8.

26. Glass-fiber insulation comprising a collection of irregularly shaped glass fibers according to claim 9.

27. Glass-fiber insulation comprising a collection of irregularly shaped glass fibers according to claim 10.

28. Glass-fiber insulation comprising a collection of irregularly shaped glass fibers according to claim 11.

29. Glass-fiber insulation comprising a collection of irregularly shaped glass fibers according to claim 12.

30. Glass-fiber insulation comprising a collection of irregularly shaped glass fibers according to claim 13.

31. Glass-fiber insulation comprising a collection of irregularly shaped glass fibers according to claim 14.

32. Glass-fiber insulation comprising a collection of irregularly shaped glass fibers according to claim 15.

33. Glass-fiber insulation comprising a collection of irregularly shaped glass fibers according to claim 16.

34. Glass-fiber insulation comprising a collection of irregularly shaped glass fibers according to claim 17.

* * * * *